Patented June 21, 1938

2,121,076

UNITED STATES PATENT OFFICE 2,121,076

MOLDING COMPOSITION OF UREA RESIN AND MODIFYING AGENT AND PROCESS OF MAKING SAME

Carleton Ellis, Montclair, N. J., assignor to Ellis-Foster Company, a corporation of New Jersey No Drawing. Application April 1, 1936, Serial No. 72,051

4 Claims. (Cl. 106—22)

This invention relates to modified urea-aldehyde resins, particularly carbamide-formaldehyde resin, which are useful in the molding art for the production of light-colored, translucent, heat-, shock-, and moisture-resisting objects.

In carrying out the invention urea or its equivalent, such as thiourea and the like, and an aldehyde, preferably formaldehyde, are caused to react to a stage where the condensation products are still water-soluble and the resin is then modified or tempered by addition of a hydrophilic carbohydrate or carbohydrate-containing substance such as wheat flour, macaroni, beans, potatoes, rice or other cereal, vegetable gums (e. g., gum arabic, gum tragacanth, tapioca gum or gum karaya), cornstarch, arrowroot starch, cassava starch, or other starch, Irish moss, alginic acid or its salts such as ammonium or calcium alginate, and related substances. By hydrophilic carbohydrate I mean those carbohydrates which are not soluble in water but show colloidal tendencies when treated with water.

In reacting the urea with the formaldehyde I use from 1 to 2 moles of formaldehyde for each mole of urea, preferably a ratio of 1.5 moles of formaldehyde to 1 mole of urea. Ordinary commercial formalin is satisfactory, but aqueous formaldehyde solution of other concentration, or a polymerized form such as paraform or trioxymethylene may be used. The formaldehyde may be replaced under appropriate conditions in whole or part by other aldehydes such as acetaldehyde and the like. It is also within the scope of this invention to substitute for part or for the whole of the urea, an equivalent such as thiourea, guanidine, methyl urea, or other resinifying amide.

The reaction between urea and formaldehyde may be carried out as follows: aqueous formalin is neutralized or adjusted to have a pH of from 6 to 8, preferably 7. A weight of urea of good grade is dissolved in the neutral formaldehyde solution and the whole is rapidly heated to boiling under a refluxing condenser, keeping the pH at 6.5 to 7 at least for the first few minutes of boiling. This may be accomplished by simply adding caustic alkali, a salt having an alkaline reaction, or an organic base; or the acidity may be controlled by any suitable buffering agent. It is also possible to treat the formaldehyde solution before dissolving the urea in it, so that it will maintain the correct acidity throughout the reaction. To this end, a very small amount of a substance such as magnesium carbonate may be added.

After the violent reaction of the urea with the formaldehyde subsides somewhat, heat may be again applied and boiling continued for a length of time depending on the rate of heating, the acidity of the reaction mixture, and the desired extent of the reaction. It is not desirable to carry the reaction beyond the stage where the products are no longer soluble in the hot reaction mixture.

The product of the reaction is preferably a clear, water-white syrup of viscosity dependent on the extent of the reactions and the concentration of the original reactants. The syrup may be thickened by boiling off part of the excess water or may be thinned somewhat by dilution with water or other appropriate solvent.

The urea-formaldehyde resin in the syrupy water-soluble stage is then modified by further reacting with a carbohydrate of hydrophilic but not necessarily water-soluble nature.

The modifiers or tempering agents may be added in the dry state to the resin syrup, or they may be previously prepared by soaking, digestion, or cooking with water. In some cases, it may be desirable to remove any excess water from the carbohydrate prior to addition to the urea resin since any added moisture serves to increase the drying time. In other cases it may be advantageous to add water to the mix in order to allow adequate time for reaction to take place between the carbohydrate substance and the urea resin, and also to permit a more intimate mixture of the reactants. Precooking in some cases tends to endow the carbohydrate with more hydrophilic qualities and serves to promote the resin-carbohydrate modification. Mechanical treatment of the carbohydrate such as grinding, shredding, or milling may also prove desirable.

The reaction between the tempering agent and the urea-formaldehyde resin may be accomplished as follows: the carbohydrate modifier is incorporated in the urea resin syrup by agitating, shaking, stirring, or otherwise intimately mixing the two reactants. The proportion of carbohydrate may advantageously lie between 10% and 60% of the modified resin calculated on the dry basis, and preferably between 20% and 40%. In certain cases it is desirable to substitute for part of the carbohydrate material one of the celluloses, such as alpha cellulose or hydrocellulose. The mixture may be immediately placed in a suitable drying device such as an oven employing a current of heated air at atmospheric pressure, or a vacuum drier employing heated shelves. Or the mixture may be further heated with or without refluxing conditions, or it may be stored without heating for a sufficient length of time, and subsequently dried. The temperature and time of drying and temperature and time of treatment prior to drying depends on the desired resinous state, on the extent of condensation already attained in the urea-formaldehyde resin, and on the particular carbohydrate used. It usually suffices to immediately subject the mix to drying conditions, the time required before removal of the main body of the moisture being adequate to permit the modifying agent to react with the urea resin.

The upper limits of time and temperature of drying are determined by the known characteristics of urea-formaldehyde resin, it being not desirable to carry the reaction too far or beyond the stage where adequate flow during the pressing operation is obtained. It is generally desirable to dry at a temperature below 75° C.
In certain cases it may be desirable to co-resinify the urea, formaldehyde, and carbohydrate. To this end, the modifier is added to the urea-formaldehyde solution before or during the urea-formaldehyde condensation, and the urea resin is thus modified in situ. Treating the carbohydrate with formaldehyde and reacting the mix with urea, or treating the carbohydrate with urea and reacting the mix with formaldehyde are also not excluded. The invention lies in the production of a tempered urea-formaldehyde resin and is not limited to the order of reaction of the components.

The dried modified urea-formaldehyde resin may be ground or pulverized. The nature of the dried material is conducive to such treatment; it requires only a short time in a ball mill to reduce the mass to a finely-divided state. The comminuted material may be screened to remove any foreign material such as husks and skins.
The powdered resinous product may be stored for long periods without deterioration. Before molding, however, it is necessary to incorporate an acid or acid generating catalyst to assist cure. Among such substances may be mentioned phthalic anhydride, acetic acid, glycerol dichlorhydrin, and acetylsalicylic acid. A lubricant such as zinc stearate or aluminum palmitate may also be incorporated to permit easy removal from the mold. An excess of lubricant is to be avoided as this tends to decrease translucency.

The conditions required to form objects by hot-pressing are the same as commonly used in the art of molding urea resin products. Safe temperatures are between 120° and 160° C., and a pressure of approximately 3000 pounds per square inch is adequate to form the usual run of moldings. The time required to "cure" or carry the polymerization to the water-resistant stage depends, among other things, on the size of the object to be molded, but will vary from a few seconds to several minutes.

A modified resin obtained by the present method possesses characteristics which permit excellent molded articles to be obtained. Complete homogeneity is attained without the extensive grinding usually necessary in producing a urea-aldehyde resin molding composition, since the mechanical condition of the resinous mass after drying (but before molding) is such that comminution may be easily accomplished. Further, it has been demonstrated by X-ray powder photographs that a carbohydrate modifier, specifically cornstarch, is completely absorbed by the urea-formaldehyde resin. For example, the X-ray pattern of starch shows 9 rings, 4 of which are very distinct. The X-ray picture of a urea resin modified with 20% by weight of cornstarch fails to show a single one of the characteristic rings of the starch molecules, but shows only that pattern ascribable to urea resin. Such behavior is analogous to the action of urea resin on cellulose, where a glucanure (glucose anhydride-urea resin compound) is formed.

A carbohydrate-tempered resin possesses translucency to a marked degree. This feature points to the use of the material for lamp shades, dome lights, radio dials, and similar objects where an illuminated surface is required. The resin may be colored by dyes to produce any desired shade; such a resin lends itself readily to the production of buttons or plateware of particularly pleasing appearance. Pigments may also be incorporated where translucency is not a necessary characteristic. The color of the modified resin itself varies, depending on the properties of the modifying substance. The tone is generally light, starches in particular producing colorless resins.

Although the resinification of two hydrophilic substances such as urea resin and carbohydrate might be expected to yield a water sensitive product, such is not the case. An object molded from such a modified resin may be immersed in boiling water without deleterious effect. This fact is also evidence of a chemical combination between the urea resin and the carbohydrate.

Certain of the resins, notably that modified by cassava starch, produce tough, hard, shock-resisting moldings. Incorporation of a small proportion of fibrous substance serves to increase the strength in other cases. It is notable that in other types of urea resin where high proportions of cellulose are incorporated, a relatively small proportion of a starch-modified urea resin increases translucency.

In the tempered urea resins of this invention the "flow", or ease of shaping an object by hot pressing, is controlled not only by the extent of polymerization of the urea-formaldehyde condensate, but also by the type and amount of the modifying agent. For example, gums such as gum karaya and the like tend to retard flow, whereas starches tend to increase or "soften" the flow. Thus, by proper selection of modifier, a desired flow may be obtained even in those cases where, for example, a urea-formaldehyde resin is worthless because of either insufficient or excessive condensation previous to molding.

Examples illustrative of the invention follow.

A urea resin syrup was prepared by dissolving 552 parts of Grade A urea in 1120 parts of 37% formaldehyde which had been adjusted to a pH 7.0 with dilute sodium hydroxide solution. 0.5 part of magnesium carbonate was added to the solution which was then boiled for 90 minutes, using a reflux condenser. This urea-formaldehyde syrup was then treated with various modifiers as shown in the following examples.

*Example 1.*—200 g. of the resin syrup and 70 g. of wheat flour were stirred together to form a paste which was dried at 68° C. in a current of air. The dried material was ground in a ball mill. 100 g. of the fine powder were further ball milled with 1 cc. of glycerol dichlorhydrin and 0.35 g. zinc stearate. The finished composition was molded at 140° C., 3500 pounds per square 70 inch, for 5 minutes. The molded articles possessed a somewhat granular structure; they were strong and somewhat translucent.

*Example 2.*—Example 1 was repeated, replacing the wheat flour with 70 g. of coarsely ground macaroni. The objects obtained were similar in appearance to those of Example 1, but the glaze was somewhat brighter and the color was a light yellow.

*Example 3.*—Example 1 was repeated, replacing the flour with 70 g. of dried white soup beans which had been ground to a medium fine powder. The objects obtained in this case were strong, partially glazed, but almost opaque; the color was a greenish gray. The poor translucency of the moldings may be attributed to the oils present in the beans.

*Example 4.*—Example 3 was repeated, the ground beans being cooked in water before being added to the resin syrup. The moldings were much more completely glazed than in the preceding case and were also quite strong mechanically.

*Example 5.*—Example 1 was repeated, using ground raw peeled potatoes instead of the flour. The molded articles showed a gray green surface and were strong.

*Example 6.*—Example 5 was repeated, cooking the potatoes before adding the urea resin. The appearance of the moldings was about the same as that of Example 5.

*Example 7.*—Example 1 was repeated, using 70 g. rice which was cooked before adding to the urea resin syrup. The moldings had a satin-like surface and were of light yellow-gray translucent appearance. The mechanical strength was good.

*Example 8.*—The wheat flour was replaced in Example 1 by 70 g. of cassava starch. The flow in this instance was soft, and the moldings were well formed and glazed, mechanically strong, and translucent.

*Example 9.*—Example 8 was repeated using arrowroot starch. The flow on molding the resin was good, and the objects were well formed and possessed a bright glaze. The translucency was excellent, and the color almost pure white.

*Example 10.*—Example 1 was repeated, using 70 g. of gum arabic. The objects were glazed, light gray in color, somewhat translucent, strong, and possessed a smooth glaze. The flow was not as good as when starch was used.

*Example 11.*—Example 10 was repeated using gum tragacanth, the flow in this case was very hard, and the moldings were colored a greenish yellow.

*Example 12.*—Example 10 was repeated, the gum arabic being replaced by tapioca gum. The molded articles were entirely glazed, and of light yellow satiny appearance, fairly translucent, and strong.

*Example 13.*—Example 10 was repeated using 70 g. of gum karaya (Indian gum). Here the flow was quite hard and the color was dark brown.

*Example 14.*—Example 1 was repeated using 400 g. of ammonium alginate paste (containing 9% solids). The composition was hard flowing. The molded articles possessed a chalky appearance and were medium brown in color.

*Example 15.*—200 g. of calcium alginate jelly (containing 10% solids) were used in place of the modifying agent of Example 14. This modified resin possessed a soft flow and gave objects which were well glazed and well formed, but which were dark brown in color and not very translucent.

*Example 16.*—Example 14 was repeated using 60 g. of Irish moss. On molding the resin, objects were obtained which were dark brown in color. The glaze was fair, and the surface showed a striated effect; the material was somewhat translucent.

*Example 17.*—Example 1 was repeated, replacing the flour with 12 g. of cornstarch and 50 g. of alpha cellulose. The moldings were light in color and possessed excellent translucency. The flow of the resin was soft, and the molded articles were mechanically strong.

*Example 18.*—Example 17 was repeated using 12 g. of potato starch in place of the cornstarch. The results on molding were identical.

*Example 19.*—300 parts of 37% aqueous formaldehyde and 150 parts of urea were boiled together under refluxing conditions for 1 hour at a pH 7. 200 parts of the resulting syrup were mixed with 55 parts of wheat flour and dried at 64° C. The dried resin was ground in a ball mill with 1% glycerol dichlorhydrin and 0.25% zinc stearate.

The finished composition was molded at 140° C., 3500 pounds per square inch, for 5 minutes. The flow was medium hard; the objects obtained were light gray colored and moderately translucent. A molding immersed in boiling water for 15 minutes became slightly soft and absorbed 4.6% of its weight of moisture.

*Example 20.*—Example 19 was repeated, using 55 parts of potato starch. The moldings in this case were almost white, very translucent, well glazed and strong. The flow was soft. On being immersed in boiling water for 15 minutes, the surface of the objects whitened somewhat but did not soften; the water absorption was 5.7%.

*Example 21.*—Example 19 was repeated, using 55 parts of rice (cooked before adding to the urea resin syrup) as the modifier. The moldings obtained from this resin, which was soft flowing, were light colored, quite translucent, well glazed, and strong. When the objects were placed in boiling water for 15 minutes, the surface became somewhat white, but did not soften; the water absorption was 6.4%.

This application is a continuation in part based on my copending application Serial 689,165, filed Jan. 28, 1924, wherein is described and claimed heat-setting urea-aldehyde resins obtained by heating under pressure a urea resin with an acid. Among the modifying or tempering agents for urea resin disclosed therein are carbohydrates such as Irish moss and algin.

While the invention has been described in detail with specific examples, such examples are illustrative and are not given as limitations since other modifications within the spirit and scope of the invention will be apparent to those skilled in the art. Thus reaction between urea and aldehyde with or without carbohydrate may be allowed to progress at room temperature or lower; a correspondingly greater extent of time being allowed to compensate sufficiently for such altered reaction temperatures.

What I claim is:

1. A molding composition in dry comminuted form comprising a carbohydrate-modified urea-aldehyde resin obtained by the drying under non-curing conditions of an admixture of a hydrophilic carbohydrate selected from the class consisting of starch-containing carbohydrates, vegetable gums and Irish moss, and a water solution of a urea-aldehyde resin formed from about 1 to 2 moles of aldehyde and about 1 mole of urea, said carbohydrate being present in such quantities that the molding composition contains from about 10 to 60% thereof on a dry basis, said composition hardening at a temperature of about 120 to 160° C. to yield a light colored, translucent, heat-, shock- and moisture-resisting product.

2. The composition as defined in claim 1, wherein the hydrophilic carbohydrate is starch.

3. The process of forming a molding composition which comprises reacting from about 1 to 2 moles of an aldehyde with about 1 mole of urea to produce a water solution of a urea-aldehyde resin, admixing with said water solution a hydrophilic carbohydrate selected from the class consisting of starch-containing carbohydrates, vegetable gums and Irish moss, drying the resulting composition under non-curing conditions to produce a dry product capable of hardening at a temperature of about 120° to 160° C. to yield a light colored, translucent, heat- shock- and moisture-resisting product.

4. The process as defined in claim 3, wherein the hydrophilic carbohydrate is starch.

CARLETON ELLIS.